United States Patent
Moser et al.

(10) Patent No.: US 7,535,362 B2
(45) Date of Patent: May 19, 2009

(54) CIRCUIT ARRANGEMENT AND METHOD FOR SUPPLYING POWER TO A TRANSPONDER

(75) Inventors: Daniel Moser, Stuttgart (DE); Helmut Moser, Heilbronn (DE)

(73) Assignee: ATMEL Germany GmbH, Heilbronn (DE)

( * ) Notice: Subject to any disclaimer, the term of this patent is extended or adjusted under 35 U.S.C. 154(b) by 158 days.

(21) Appl. No.: 11/349,939

(22) Filed: Feb. 9, 2006

(65) Prior Publication Data

US 2006/0187049 A1 Aug. 24, 2006

(30) Foreign Application Priority Data

Feb. 9, 2005 (DE) ............... 10 2005 005 812

(51) Int. Cl.
*G08B 13/14* (2006.01)
(52) U.S. Cl. ............ 340/572.5; 340/572.3; 340/572.7; 340/572.8; 340/442; 340/444; 340/445; 340/447; 73/146; 73/146.2
(58) Field of Classification Search ............ 340/572.5, 340/572.3, 572.7, 572.8, 442, 444, 445, 447; 73/146, 146.2
See application file for complete search history.

(56) References Cited

U.S. PATENT DOCUMENTS

| | | | |
|---|---|---|---|
| 3,895,295 A * | 7/1975 | Mittelmann | 324/142 |
| 4,065,805 A | 12/1977 | Unterweger et al. | |
| 5,541,604 A * | 7/1996 | Meier | 342/42 |
| 5,731,754 A * | 3/1998 | Lee et al. | 340/447 |
| 6,272,321 B1 | 8/2001 | Bruhnke et al. | |
| 6,278,363 B1 * | 8/2001 | Bezek et al. | 340/442 |
| 6,369,712 B2 * | 4/2002 | Letkomiller et al. | 340/572.1 |
| 6,703,921 B1 * | 3/2004 | Wuidart et al. | 340/10.4 |
| 6,996,726 B1 * | 2/2006 | Den Besten et al. | 713/300 |

FOREIGN PATENT DOCUMENTS

| | | |
|---|---|---|
| AT | 344 827 | 8/1978 |
| DE | 196 14 455 A1 | 10/1997 |
| DE | 197 55 250 A1 | 7/1999 |
| DE | 100 48 040 A1 | 4/2002 |
| DE | 101 51 856 A1 | 5/2003 |
| DE | 699 13 745 T2 | 10/2004 |
| EP | 0 505 906 A1 | 9/1992 |
| EP | 1 014 301 A1 | 6/2000 |
| EP | 1 188 144 B1 | 3/2002 |
| EP | 1 387 313 A2 | 2/2004 |
| JP | 2002-93264 | 3/2002 |

* cited by examiner

*Primary Examiner*—Tai T Nguyen
(74) *Attorney, Agent, or Firm*—Muncy, Geissler, Olds & Lowe, PLLC (57) ABSTRACT

A circuit arrangement is provided for a power supply to a transponder including an antenna resonant circuit and a downstream rectifier circuit for receiving and for rectifying an electromagnetic signal, a charging capacitor connected downstream on the output side of the rectifier circuit to provide a first supply voltage, with a tuning circuit for tuning the antenna resonant circuit to its resonance frequency, and with an auxiliary voltage source, which is designed to provide a second supply voltage, lower than the first supply voltage, for supplying the tuning circuit. A method is also provided for supplying power to a transponder with a first supply voltage, as well as a transponder having a circuit arrangement for a power supply.

14 Claims, 5 Drawing Sheets

CIRCUIT ARRANGEMENT AND METHOD FOR SUPPLYING POWER TO A TRANSPONDER

This nonprovisional application claims priority under 35 U.S.C. § 119(a) on German Patent Application No. DE 102005005812, which was filed in Germany on Feb. 9, 2005, and which is herein incorporated by reference.

BACKGROUND OF THE INVENTION

1. Field of the Invention

The present invention relates to a circuit arrangement for power supply to a transponder, a method for supplying power to a transponder with a first supply voltage, and to a transponder having a circuit arrangement for a power supply.

2. Description of the Background Art

The invention falls within the realm of transponder technology and in particular within the field of contactless communication. Although usable in principle in any communication systems, the present invention and its underlying problem are explained hereafter with reference to transponders for tire pressure control systems and the applications thereof. For a general background of transponder technology, reference is made to the "RFID-Handbuch" (RFID Handbook) by Klaus Finkenzeller, Hanser Verlag, $3^{rd}$ updated edition, 2002, which was translated into English by John Wiley & Sons.

Transponders are microelectronic components, which are designed to be able to store information and have an antenna array for this purpose, in order to enable contactless reading and modification of the stored information. In the case of transponders, an electromagnetic signal transmitted by the base station is received by the transponder and demodulated. Active, semipassive, and passive transponders are differentiated here depending on the design of their energy supply. In contrast to active transponders, passive transponders do not have their own energy supply, so that the energy necessary in the passive transponder for demodulating and decoding the received electromagnetic signal must be obtained from the electromagnetic signal itself.

Passive transponders are employed primarily in the field of contactless communication for identification (RFID=Radio Frequency Identification) and in tire pressure control systems. Because passive transponders do not have their own energy supply, the energy necessary for supplying the transponder must be removed by absorption modulation from the transmitted electromagnetic wave. In a currently employed passive 150 kHz transponder system, this is realized in the electromagnetic near field by means of inductive coupling. The energy range achieved thereby is within the range of a few centimeters to about 0.5 m and depends inter alia on the specific national HF regulations.

The magnetic portion of an electromagnetic field is utilized in this regard for energy and data transmission, and coils, which represent the inductance of an antenna resonant circuit, are employed as antennas. In order to achieve a sufficient range in passive transponder systems, apart from a uniform alignment or polarization of the antenna coils by the transmitting station and transponder, synchronization of the resonance frequency of the antenna resonant circuit with the working frequency is relevant in addition. The problem arises in practice that frequency-detuning effects change the resonance frequency of the antenna resonant circuit of the transponder. Detuning of the antenna resonant circuit occurs inter alia due to temperature-related drift phenomena at the resonant circuit elements or due to manufacturing-related deviations. Because of this, the resonance frequency of the antenna resonant circuit is no longer trimmed precisely to the transmission frequency, as a result of which the charging current is reduced. It is problematic here that their coupling relationships then worsen, as a result of which even with minor detuning of the resonant circuit, the distance within which reliable energy and data transmission is possible declines considerably.

If the resonance frequency of an antenna resonant circuit is precisely tuned to the frequency of the transmitted or received electromagnetic signal, the impedance of the antenna resonant circuit still consists only of the real ohmic resistance, whereby the maximum charging current and thereby also the maximum field strength are achieved. The maximum possible charging current is then limited solely by the antenna driver and the current supply. Antenna resonant circuits reach the maximum field strengths necessary for data and energy transmission within a tolerance range, which characterizes the range within which the resonance frequency may deviate from the transmission frequency, yet reliable data and energy transmission is still assured. The tolerance range is a gauge for the maximum allowable deviation of the resonance frequency of the antenna resonant circuit from the transmission frequency. If the resonance frequency of the resonant circuit is outside this tolerance range, reliable data and energy transmission is no longer possible. The highest effectiveness in energy transmission is therefore achieved when the antenna resonant circuit of the base station and the antenna resonant circuit of the transponder are operated within the range of the resonance frequency.

The charging of a charging capacitor, which is used for the energy supply to the transponder, occurs via the antenna resonant circuit and rectifier connected downstream to the circuit. The charging current for charging the charging capacitor is highest when the antenna resonant circuit is optimally tuned to the resonance frequency. In fact, in many transponders a rather low charging current is sufficient, because in many transponder applications the charging capacitor is made relatively small. Nevertheless, for some transponder applications, such as, for example, the aforementioned tire pressure control systems, there is need for a relatively large charging capacitor and thereby a high supply voltage.

However, a considerably lower charging current results if the transponder and its antenna resonant circuit are not tuned to the resonance frequency. Because of the lower antenna current, it takes significantly longer to charge the charging capacitor of the transponder. In the extreme case, the capacitor can never be completely charged to its nominal voltage. This has the result that the corresponding transponder does not have its assigned function and thereby is not able to fulfill its task. For this reason, primarily in transponder applications equipped with large charging capacitors, there is a need to tune the antenna resonant circuit to the resonance frequency of a received electromagnetic signal.

The resonance frequency of an antenna resonant circuit of a transponder is typically set by parallel connection of additional capacitive elements to the capacitor of the antenna resonant circuit. The information for the capacitive elements to be connected in parallel is stored in a memory especially provided for this. The problem in tuning the transponder resonant circuit now is to provide as rapidly as possible a voltage to tune the antenna resonant circuit. If the antenna resonant circuit is detuned, however, the charging of the charging capacitor takes very long, so that a voltage for tuning becomes available only very late.

For a general background on such tuning devices to tune an antenna resonant circuit, reference is made to the German patent applications DE 197 55 250 A1 and DE 196 14 455 A1.

SUMMARY OF THE INVENTION

It is therefore an object of the present invention to provide as rapid a charging as possible particularly of a transponder equipped with a large charging capacitor.

In an embodiment, a circuit arrangement is provided for the power supply to a transponder, that includes an antenna resonant circuit and a downstream rectifier circuit for receiving and for rectifying an electromagnetic signal, a charging capacitor connected downstream on the output side of the rectifier circuit to provide a first supply voltage, with a tuning circuit for tuning the antenna resonant circuit to its resonance frequency, and with an auxiliary voltage source, which is designed to provide a second supply voltage, higher than the first supply voltage, for supplying the tuning circuit.

A method for supplying power to a transponder with a first supply voltage, with a first operating mode, in which a first capacitive element of a receiving-side antenna resonant circuit is tuned to its resonance frequency and during which a charging capacitor remains inactive, and with a second operating mode, in which the charging capacitor is charged to provide the first supply voltage.

A transponder, particularly for a tire pressure control system, with a receiving path in which a circuit arrangement of the invention is located for the power supply to the transponder.

In the case of an incompletely tuned antenna resonant circuit, the charging of the charging capacitor, which is used for the power supply to the transponder, takes very long. In the case of a tuned antenna resonant circuit, however, this charging process proceeds significantly more rapidly. Further, for tuning the antenna resonant circuit, a relatively low energy and thereby a relatively low voltage is necessary, which in any case is significantly higher than the voltage provided by the charging capacitor.

To tune the antenna resonant circuit, it is not necessary to wait until the charging capacitor is charged. Rather, according to the invention, this antenna resonant circuit is tuned in terms of time before the charging of the charging capacitor, so that the charging capacitor can then be charged with an optimal charging current. The voltage for tuning the antenna resonant circuit is thereby provided by an auxiliary voltage source, which is preferably formed as an auxiliary capacitor. The charging of the charging capacitor thus occurs in each case with a tuned antenna resonant circuit, so that the charging current becomes maximal and the charging time for charging the charging capacitor minimal. The present invention thereby allows a multistage power management for time-optimized charging of the charging capacitor.

This is particularly advantageous for transponder applications which have a very large charging capacitor and in which the energy supply does not occur continuously from the electromagnetic field, but is always interrupted and is thereby more or less pulse-wise. Such applications are, e.g., tire pressure control systems, in which the transponder is located, e.g., at a place on the tire rim. During operation of this tire pressure transponder, the energy supply from the electromagnetic field depends on the specific angle range of the transponder. In these applications, it is especially important to assure a maximum data and energy transmission within the angle range in which the transponder is located within the sphere of action of the electromagnetic field. This is realized optimally by the multistage power management of the invention.

In an advantageous embodiment, the auxiliary voltage source has an auxiliary capacitor, which is placed between the outputs of the rectifier circuit and the inputs of the tuning circuit and which has a much lower capacitance than the charging capacitor. In particular, the charging capacitor preferably has a capacitance in the range of 0.5 µF to 5 µF, preferably about 2 µF. The auxiliary capacitor, in contrast, has a capacitance in the range of 50 pF to 500 pF. The auxiliary capacitor is therefore significantly smaller in comparison with the charging capacitor, being typically dimensioned several powers of 10 smaller than the charging capacitor.

In an embodiment, an at least two-phase charging circuit is provided, which has a first charging phase for charging the auxiliary capacitor to the second supply voltage and a second charging phase for charging the charging capacitor to the first supply voltage. The second charging phase charges the charging capacitor typically only when a predefinable charging threshold of the second supply voltage is exceeded.

According to a further embodiment of the invention, the charging circuit and particularly the second charging phase can have at least one controllable switch, which is placed in series between an output connection of the rectifier circuit and an electrode connection of the charging capacitor.

In another embodiment, the charging circuit can have a drive circuit, which has a control signal for turning a digitally operated controllable switch on and off depending on the second supply voltage and a predefinable charging threshold.

In another embodiment, the charging circuit can have a bandgap control circuit, which generates a reference potential for triggering a controllable switch, formed as a transistor and operated in an analog characteristic region, depending on the second supply voltage and depending on a switching potential of the transistor.

According to a further embodiment, the antenna resonant circuit has at least one antenna coil and a first capacitive element in a parallel connection.

In an embodiment, the tuning circuit can have a memory in which information for tuning a first capacitive element of the antenna resonant circuit is stored. The memory, which thereby is used as a control for triggering switches of the capacitive tuning network, is preferable formed as an EEPROM.

Another embodiment provides that the tuning circuit can have at least one additional capacitive element, which is/are connectable via switching devices and is/are arranged parallel to one another and to the first capacitive element and of which at least one of the additional capacitive elements can be connected to the first capacitive element.

An embodiment of the method of the invention includes the following successively performed process steps: providing an at least partially discharged, inactively connected charging capacitor of a transponder provided; receiver-side receiving and rectification of an electromagnetic signal; charging of an auxiliary capacitor with a rectified current signal for providing a second supply voltage higher than the first supply voltage; tuning of a receiver-side antenna resonant circuit to its resonance frequency with use of the second supply voltage until the antenna resonant circuit is tuned; connection of the charging capacitor; and charging of the charging capacitor to provide the first supply voltage of the transponder.

Preferably, to activate the charging capacitor, the controllable switch is switched on only if the second supply voltage has reached and/or exceeded a predefinable charging threshold.

In an embodiment, the antenna resonant circuit is tuned to the resonance frequency of the antenna resonant circuit by parallel connection or disconnection of additional capacitive elements.

In another embodiment, the tuning in process step (d) occurs with the use of previously stored tuning information.

The tuning information can be stored before process step (c) and/or particularly before the first and second operating mode, the tuning information being determined transmitter-side from the frequency of the transmitted electromagnetic signal received by the transponder.

In a further embodiment, the antenna resonant circuit can be activated by an LF signal, particularly by a 125-kHz frequency signal.

In yet a further embodiment the transponder can contain a sensor, designed to pick up tire-specific parameters, an analog-digital converter, which converts an analog signal with the tire-specific parameters into a digital signal, an encoder which encodes the digital signal, and a modulator, which modulates the encoded signal. A capacitive pressure sensor for tire pressure measurement is preferable provided in this case.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the figures of the drawing, the same and functionally identical elements and signals, if not specified otherwise, are provided with the same reference characters.

Figure 1:
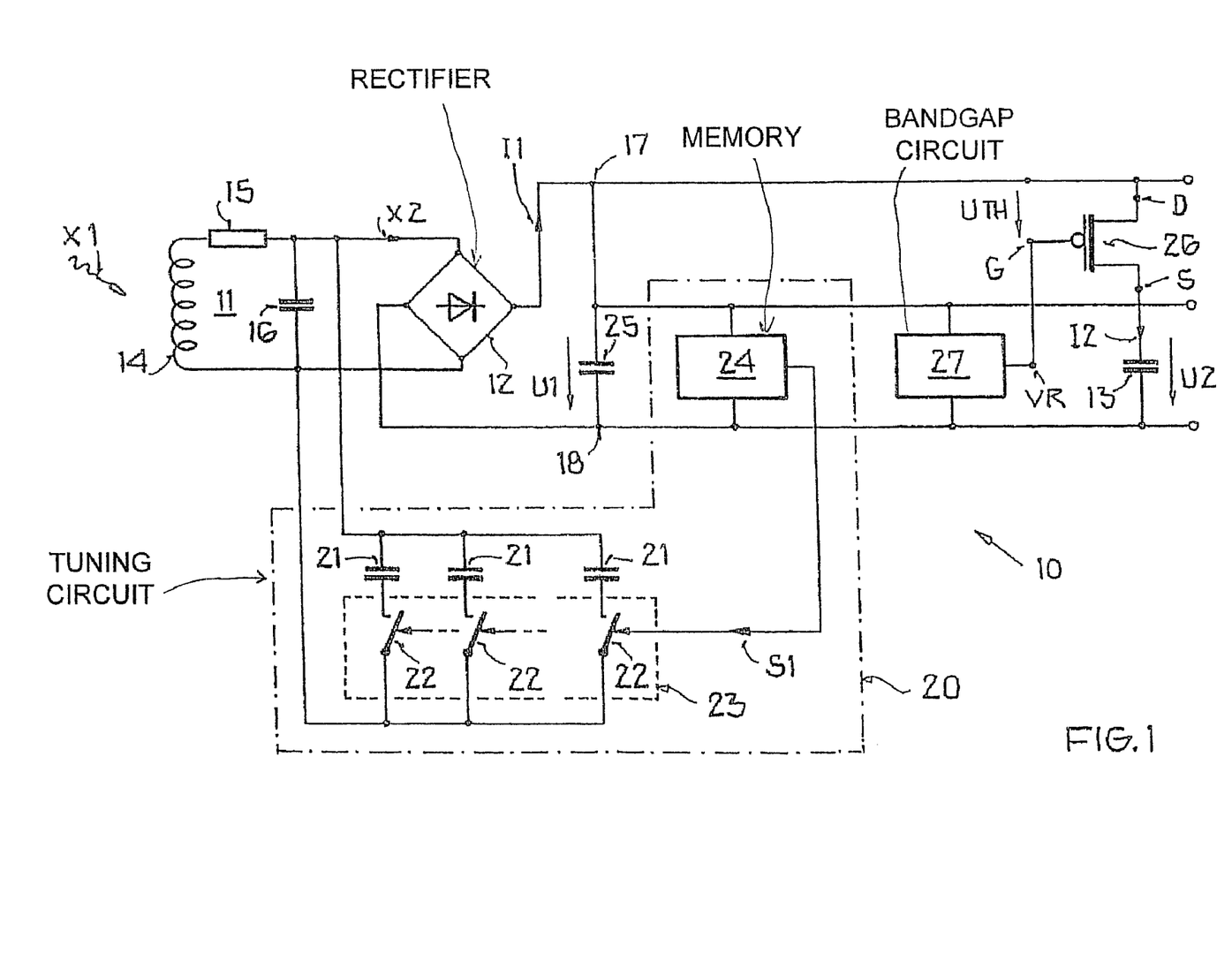
FIG. 1 illustrates a first embodiment of a circuit arrangement of the invention.

FIG. 1 shows a first, especially preferred exemplary embodiment of a circuit arrangement of the invention. In this connection, FIG. 1 shows only the receiving path of a transponder (not shown) for a tire pressure control system.

In FIG. 1, the circuit arrangement of the invention for the power supply to the transponder is identified with the reference character 10. The circuit arrangement 10 has on the receiving side an antenna resonant circuit 11, with a downstream rectifier circuit 12 and a charging capacitor 13, which is also called a backup capacitor.

The antenna resonant circuit 11 has an inductive antenna 14, which is concisely called an antenna coil 14 hereafter, and a resistive element 15 assigned in series thereto, for example, a resistor 15. The antenna coil 14 has the function of picking up an electromagnetic signal X1 from an electromagnetic field and to generate an AC signal X2 therefrom. A capacitive element 16, for example, a capacitor 16, is connected in parallel for buffering to the series connection of antenna coil 14 and resistive element 15.

The elements 14-16 of the antenna resonant circuit 11, interconnected in this way with one another, are connected to the inputs of the rectifier circuit 12. The AC signal X2 provided by the antenna resonant circuit 11 is therewith supplied to the rectifier circuit 12. The rectifier circuit 12 generates a rectified current signal I1 therefrom, a charging current, by which the charging capacitor 13, located between the outputs 17, 18 of the rectifier circuit 12, can be charged.

The charging capacitor 13 functions as a power supply to supply an integrated circuit, implemented in the transponder, with a supply voltage U2. In particular, the transponder function is assured with this supply voltage U2, i.e., unidirectional data transmission from transponder to base station and optionally also bidirectional data communication from the base station to the transponder and back must be enabled. In the case of a tire pressure transponder, the transponder must be capable of picking up the tire-specific parameters, for example, the tire pressure, tire temperature, tire rotations, etc., to convert the thus obtained analog signals to digital signals and to send these back to the base station.

The circuit arrangement 10 furthermore has a tuning circuit 20. The tuning circuit 20 contains a capacitance network with capacitive elements 21, which are concisely called trimming capacitors 21 hereafter. In the example of FIG. 1, the capacitance network has several trimming capacitors 21, arranged parallel to one another and parallel to capacitive element 16 of the antenna resonant circuit 11. Single or several of these trimming capacitors 21 can be connected in parallel to capacitive element 16 of antenna resonant circuit 11 or also again disconnected by a specific controllable switch 22 of a switching device 23. The controllable switches 22 are triggered by specific control signals S1 from memory 24. Memory 24, located between outputs 17, 18 of rectifier circuit 12, is formed in the shown exemplary embodiment as an EEPROM memory 24.

The information for tuning the antenna resonant circuit 11 is stored in EEPROM memory 24, therefore information on which and how many trimming capacitors 21 are to be connected in parallel to or disconnected from capacitive element 16. Depending on this information stored in memory 24, control signals S1 for turning trimming capacitors 21 on and off are generated. This information, stored in memory 24, is typically determined by a transmitter-side base station not shown in FIG. 1, for example, by an attenuation, determined by the base station, of antenna resonant circuit 11 of the transponder; it is written in memory 24 via the receiving path in a manner known per se. It is therefore assumed that at the beginning the two-phase charging process of the invention, the appropriate information for tuning the antenna resonant circuit is already present in the tuning memory.

The circuit arrangement 10 furthermore has an auxiliary capacitor 25 also located between outputs 17, 18 of rectifier circuit 12. Auxiliary capacitor 25 is first charged by the charging current I1 generated on the output side of rectifier circuit 12, so that an auxiliary voltage U1 drops across auxiliary capacitor 25. This auxiliary voltage U1 of the auxiliary capacitor 25 is used for the power supply to tuning circuit 20 and particularly to memory 24 located therein.

Circuit arrangement 10 of the invention has a two-phase loading circuit, auxiliary capacitor 25 being a component of the first charging phase. The second charging phase has a controllable switch 26 and a bandgap control circuit 27 triggering this switch 26.

In the preferred exemplary embodiment of FIG. 1, the controllable switch 26 is formed as a PMOS transistor (PMOS-FET), the PMOS-FET 26 being formed here as a high-side switch. PMOS-FET 26 has a turn-on voltage UTH (switching threshold or threshold voltage). In this case, the controlled section (drain-source section) of PMOS-FET 26 is placed in series with charging capacitor 13 and this series connection is placed between output connections 17, 18. Only auxiliary capacitor 25 is charged here. In the off state, therefore no charging current I1 flows through PMOS-FET 26, so that in this case charging capacitor 13 is not charged. In the on state, charging capacitor 13, on the contrary, is charged by the charging current I1. The bandgap circuit 27, which is placed between connections 17, 18 and which thereby is fed by the auxiliary voltage U1, is provided for turning PMOS-FET 26 on and off. The bandgap circuit 27 is designed to provide at its output a reference potential VR, by which it is possible to trigger a control connection G of PMOS-FET 26. The PMOS-FET 26 in FIG. 1 is operated in an analogous manner, therefore within the linear range of its characteristic.

Figure 2:
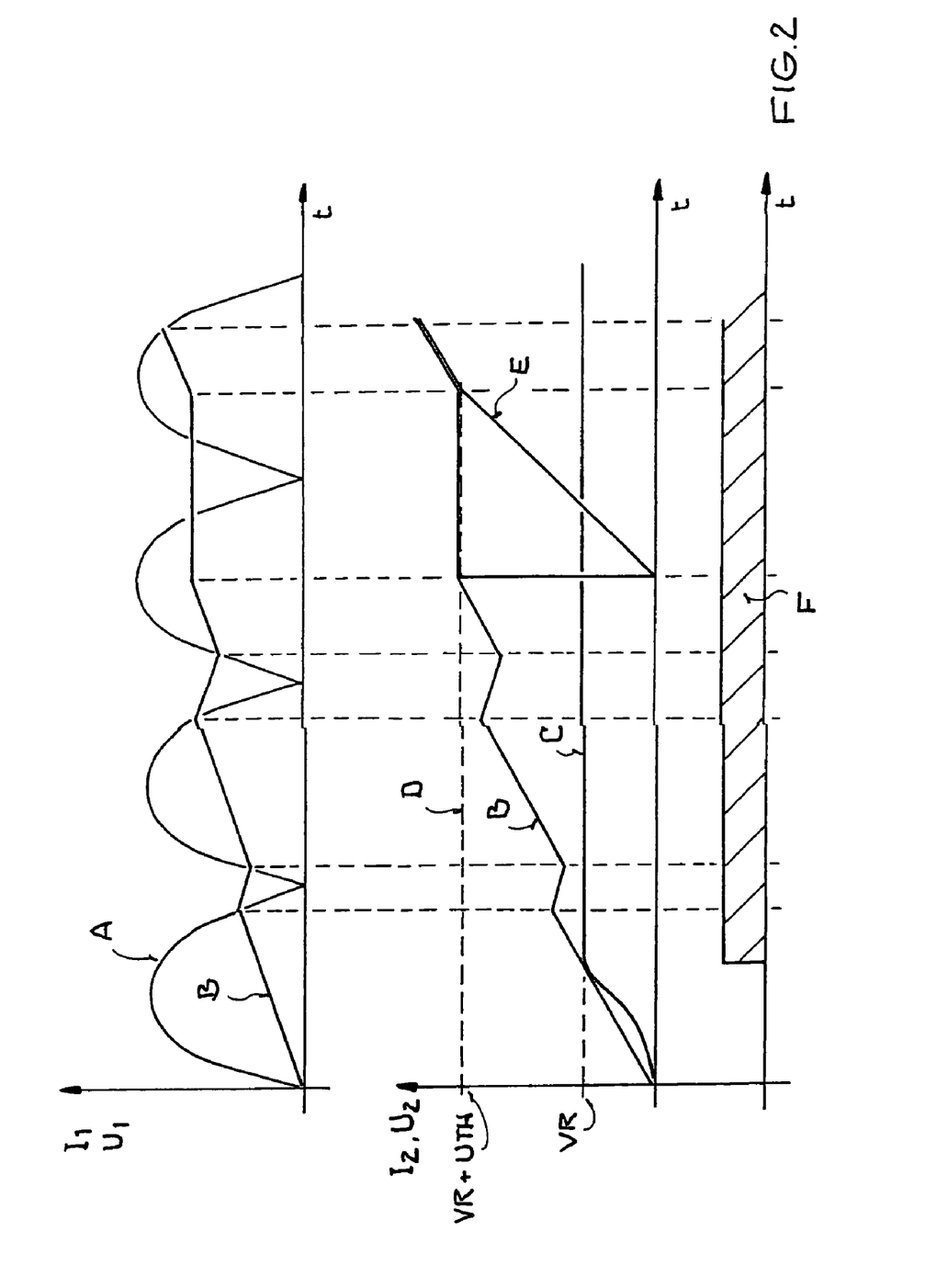
FIG. 2 shows signal-time diagrams to illustrate a two-phase charging process of the circuit arrangement of FIG. 1.

The mode of operation of the circuit arrangement 10 of the invention and particularly of the two-phase charging circuit implemented therein is described hereafter using the signal-time diagrams of FIG. 2.

FIG. 2 shows the signal curves during use in a tire pressure control system, in which the transponder therefore is placed at the rim of the appropriate tire. Curve A here shows the charging current I1, which is made available by the rectifier circuit 12. The charging current I1 charges auxiliary capacitor 25, which is much smaller than charging capacitor 13, so that an auxiliary voltage (see curve B) declines at auxiliary capacitor 25. This auxiliary voltage U1 now increases more or less continuously. If the auxiliary voltage U1 is large enough, a reference potential VR (see curve C) for triggering PMOS-FET 26 is generated by the bandgap circuit 27. It is essential here that the reference potential VR increases before PMOS-FET 26 can become active. This can be prevented preferably by selecting the threshold voltage UTH of PMOS-FET 26 in such a way that the reference potential VR increases before PMOS-FET 26 transitions to a conductive state.

The charging current I1 for charging the charging capacitor 13 now flows only when the auxiliary voltage U1 in terms of value has exceeded the value of the reference potential VR plus the value of the threshold voltage UTH, thus when the following applies:

$$U1 > |VR + UTH|$$

This threshold is designated in FIG. 2 with the reference character D. As soon as the auxiliary voltage U1 exceeds this threshold line D, PMOS-FET 26 becomes conductive. As a result, charging capacitor 13 is rapidly charged; in FIG. 2, this charging current I2 is designated by curve E. The auxiliary voltage U1 (curve B) now no longer increases at first, because the charging current I1 is used most extensively to charge charging capacitor 13. The auxiliary voltage U1 remains approximately at the value of the voltage threshold D. The auxiliary voltage U1 now no longer increases at first until charging capacitor 13 is charged to such an extent that voltage U2 dropping across charging capacitor 13 has approximately achieved the voltage threshold D. After this point in time, auxiliary voltage U1 increases again.

It is evident from FIG. 2 that with the auxiliary voltage U1 a voltage is available with which the tuning by trimming capacitors 21 can occur, before the very large charging current I2 flows to charge charging capacitor 13. In FIG. 2, the time period after which antenna resonant circuit 11 can be tuned by the tuning circuit 20 is designated by the reference character F.

Depending on the layout and dimensioning of the two-phase charging circuit and tuning circuit 20, the tuning of antenna resonant circuit 11 to the resonance frequency occurs either shortly before or shortly after the reference threshold VR is generated.

Figure 3:
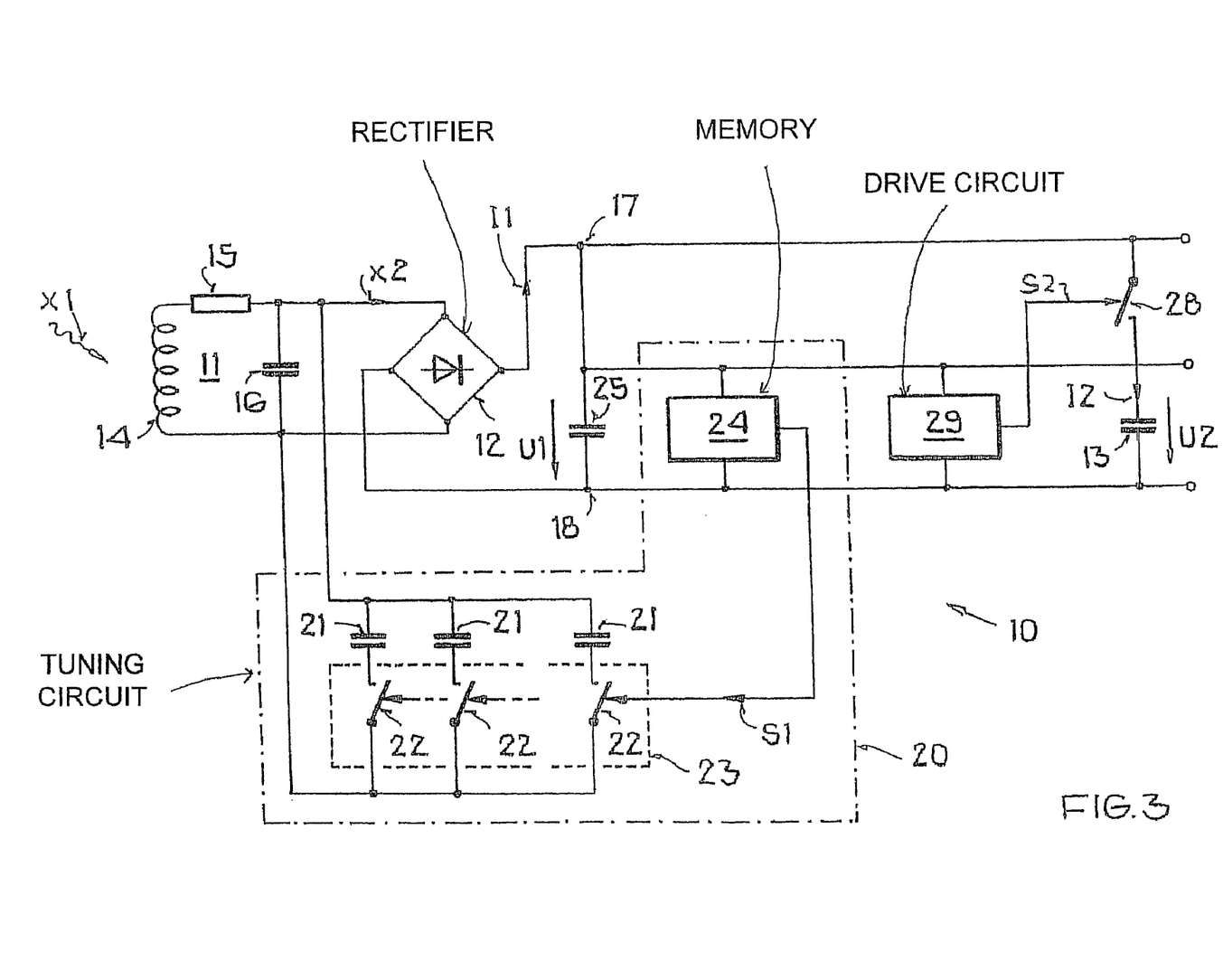
FIG. 3 illustrates a second embodiment of the circuit arrangement of the invention.

In contrast to the exemplary embodiment of FIG. 1, controllable switch 28 in the exemplary embodiment of FIG. 3 is designed as any digital switch 28 desired. For triggering, a drive circuit 29, which is also supplied by the auxiliary voltage U1, is provided here, which provides a control signal S2 on the output side, by which controllable switch 28 can be controlled digitally. Examples of a digital switch 28 here are a MOSFET, JFET, bipolar transistor, etc., which in each case can be operated within its digital range of the characteristic.

Figure 4:
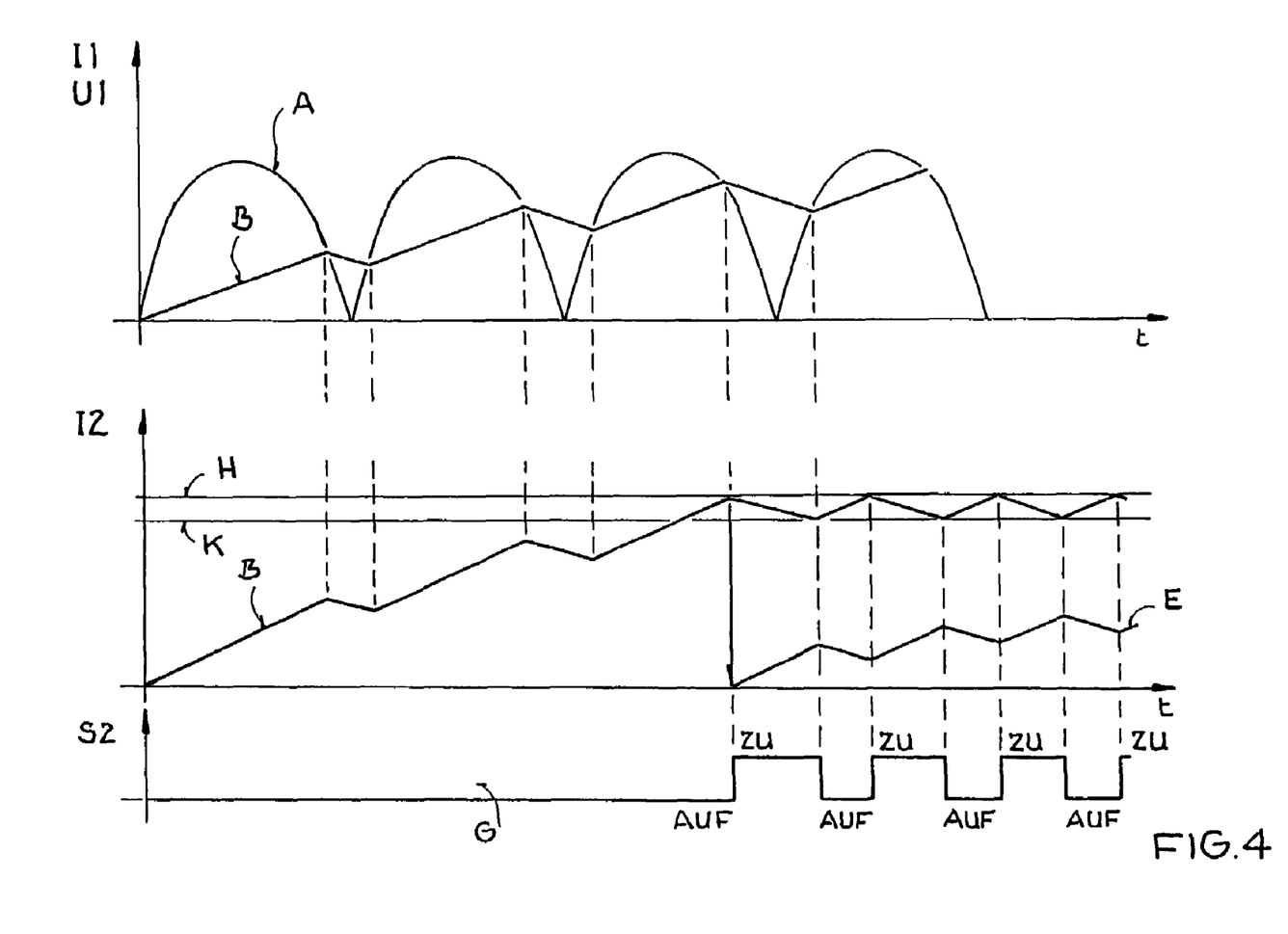
FIG. 4 shows signal-time diagrams to illustrate the two-phase charging process of the circuit arrangement of FIG. 3.

The mode of operation of the circuit arrangement of the invention in FIG. 3 will be explained in greater detail hereafter with use of the signal-time diagrams of FIG. 4.

The generation of the auxiliary voltage U1 occurs here analogously to the circuit arrangement described with the help of FIG. 1. In contrast thereto, however, a control circuit 29 is provided here, which depending of the value of the auxiliary voltage U1 closes the digitally operated controllable switch 28 to charge charging capacitor 13 and/or opens it again, if the auxiliary voltage U1 falls below a certain threshold value. The tuning by trimming capacitors 21 occurs during the time period G, therefore before controllable switch 28 is closed to charge charging capacitor 13 for the first time.

Attention must be focused here that the auxiliary voltage U1 never falls below a predefined AC signal threshold H. Thereby, a switching hysteresis is provided by means of drive circuit 29 and control signal S2 provided at the output side by this drive circuit 29; during the hysteresis, controllable switch 28 is closed and charging capacitor 13 charged, as soon as the auxiliary voltage U1 reaches a first voltage threshold H, and the switch is opened again if the auxiliary voltage U1 reaches a lower AC signal threshold K, which is below the upper AC signal threshold H.

Figure 5:
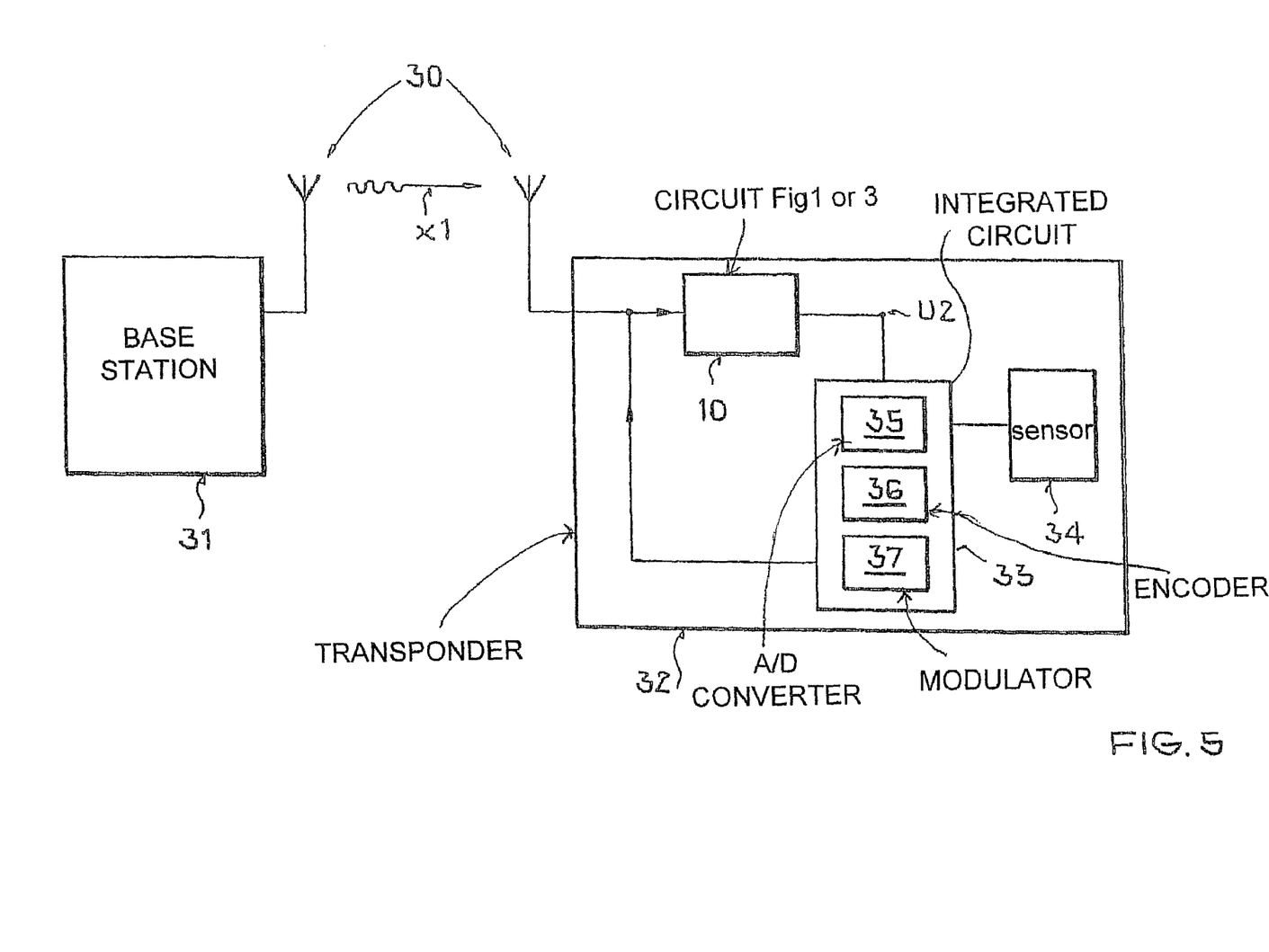
FIG. 5 is a block diagram of a tire pressure control system with a tire pressure transponder and base station.

FIG. 5 shows a tire pressure control system in a block diagram. The tire pressure control system designated here with reference character 30 contains a base station 31 and at least one tire pressure transponder 32. Base station 31 is configured in a manner known per se to generate electromagnetic signals X1 for energy and data transmission. Base station 31, moreover, as was described before, determines the information necessary for tuning transponder resonant circuit 11 and transmits said information by means of electromagnetic signals X1 to transponder 32, where it is stored in a tuning memory provided specifically for this.

The transponder 32 has in its receiving path a circuit 10 for the power supply to transponder 32; for example, the circuit can be formed in accordance with the exemplary embodiments in FIGS. 1 and 3. The circuit arrangement 10, after antenna resonant circuit 11 has been tuned, generates on the output side a supply voltage U2, which is used for the power supply to an integrated circuit 33 located in transponder 32.

The transponder 32 furthermore has a sensor 34, which, e.g., is made as a capacitive pressure sensor and which is thereby provided for tire pressure measurement. Furthermore, an analog-digital converter 35 is provided, which converts the analog signal of sensor 34, which contains tire-specific parameters (e.g., the tire pressure), into a digital signal and supplies it to an encoder 36. A modulator 37, which modulates the encoded signal, is connected downstream to encoder 36.

Although the present invention was described above with reference to a preferred exemplary embodiment, it is not limited thereto but can be modified in many ways.

Thus, the invention is not limited solely to a tire pressure control system, although the invention is most advantageous there, but it can be used in any transponder applications, such as, for example, in RFID transponders.

The invention is also not limited to the circuit variants shown FIGS. 1 and 3. Thus, the tuning circuit can be expanded as desired, for example, with a different design of the memory, with use of a more or less complex capacitance network to provide the switchable trimming capacitors, etc. Furthermore, instead of a PMOS transistor, it is naturally possible to use any transistor having the functionality of the analog operated transistor. It would also be conceivable to use a charging circuit having more than two phases, particularly for applications in which the charging capacitor has a very high capacitance and/or the tuning circuit requires a relatively high supply voltage.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit arrangement for a power supply to a transponder, the circuit arrangement comprising:
    an antenna resonant circuit and a downstream rectifier circuit for receiving and for rectifying an electromagnetic signal;
    a charging capacitor connected downstream of an output side of the rectifier circuit to provide a first supply voltage;
    a tuning circuit for tuning the antenna resonant circuit to a resonance frequency; and
    an auxiliary voltage source for providing a second supply voltage that is higher than the first supply voltage to the tuning circuit, whereby the antenna resonant circuit is tuned to provide a charging current of the charging capacitor which is maximized and a charging time of the charging capacitor which is minimized.

2. The circuit arrangement according to claim 1, wherein the auxiliary voltage source has an auxiliary capacitor which is provided between outputs of the rectifier circuit and inputs of the tuning circuit, and which has a lower capacitance than the charging capacitor.

3. The circuit arrangement according to claim 1, wherein the charging capacitor has a capacitance in the range of 0.5 µF to 5 µF and/or the auxiliary capacitor has a capacitance in the range of 50 µF to 500 µF.

4. The circuit arrangement according to claim 1, wherein the antenna resonant circuit has at least one antenna coil and a first capacitive element in a parallel connection.

5. The circuit arrangement according to claim 1, wherein the tuning circuit has a memory or an EEPROM, in which information for tuning a first capacitive element of the antenna resonant circuit is stored.

6. The circuit arrangement according to claim 1, wherein the tuning circuit has at least one additional capacitive element, which is connectable via at least one switching device and is arranged parallel to one another and to the first capacitive element and of which at least one can be connected to the first capacitive element.

7. A circuit arrangement for a power supply to a transponder, the circuit arrangement comprising:
    an antenna resonant circuit and a downstream rectifier circuit for receiving and for rectifying an electromagnetic signal;
    a charging capacitor connected downstream of an output side of the rectifier circuit to provide a first supply voltage;
    a tuning circuit for tuning the antenna resonant circuit to a resonance frequency and
    an auxiliary voltage source for providing a second supply voltage that is higher than the first supply voltage to the tuning circuit,
    wherein an at least two-phase charging circuit is provided that has a first charging phase for charging an auxiliary capacitor to the second supply voltage and a second charging phase for charging the charging capacitor to the first supply voltage, the second charging phase charging the charging capacitor only when a predefinable charging threshold of the second supply voltage is exceeded.

8. The circuit arrangement according to claim 7, the charging circuit has at least one controllable switch, which is placed in series between an output connection of the rectifier circuit and an electrode connection of the charging capacitor.

9. The circuit arrangement according to claim 7, wherein the charging circuit has a drive circuit, which has a control signal for turning a digitally operated controllable switch on and off on the basis of the second supply voltage and the predefinable charging threshold.

10. The circuit arrangement according to claim 7, wherein the charging circuit has a bandgap control circuit that has a reference potential for triggering a controllable switch, which is formed as a transistor and operated in an analog characteristic region, depending on the second supply voltage and depending on a switching potential of the transistor.

11. A transponder for a tire pressure control system, the transponder comprising:
    a receiving path in which a circuit arrangement is located for power supply to the transponder, the circuit arrangement comprising:
    an antenna resonant circuit and a downstream rectifier circuit for receiving and for rectifying an electromagnetic signal;
    a charging capacitor connected downstream of an output side of the rectifier circuit to provide a first supply voltage;
    a tuning circuit for tuning the antenna resonant circuit to a resonance frequency; and
    an auxiliary voltage source for providing a second supply voltage that is higher than the first supply voltage to the tuning circuit, whereby the antenna resonant circuit is tuned to provide a charging current of the charging capacitor which is maximized and a charging time of the charging capacitor which is minimized.

12. The transponder according to claim 11, wherein the transponder further comprises:
    a sensor for detecting tire-specific parameters;
    an analog-digital converter, which converts an analog signal with the tire-specific parameters into a digital signal;
    an encoder, which encodes the digital signal; and
    a modulator, which modulates the encoded signal.

13. The transponder according to claim 12, wherein the sensor is a capacitive pressure sensor for tire pressure measurement.

14. A circuit arrangement for a power supply to a transponder, the circuit arrangement comprising:
- an antenna resonant circuit and a downstream rectifier circuit for receiving and for rectifying an electromagnetic signal;
- a charging capacitor connected downstream of an output side of the rectifier circuit to provide a first supply voltage to an integrated circuit of the transponder;
- a tuning circuit for tuning the antenna resonant circuit to a resonance frequency; and
- an auxiliary voltage source connected downstream to an output of the rectifier circuit for providing a second supply voltage to the tuning circuit substantially immediately after a rectifier current is applied, the second supply voltage being higher than the first supply voltage.

* * * * *